(12) United States Patent
Shimizu et al.

(10) Patent No.: US 9,197,130 B2
(45) Date of Patent: Nov. 24, 2015

(54) REGULATOR DEVICE HAVING DEGRADATION DETECTION

(71) Applicant: FUJITSU LIMITED, Kawasaki-shi, Kanagawa (JP)

(72) Inventors: Hirofumi Shimizu, Kawasaki (JP); Kazunori Kasuga, Yokohama (JP); Katsutoshi Kondo, Funabashi (JP)

(73) Assignee: FUJITSU LIMITED, Kawasaki (JP)

( * ) Notice: Subject to any disclaimer, the term of this patent is extended or adjusted under 35 U.S.C. 154(b) by 45 days.

(21) Appl. No.: 13/929,069

(22) Filed: Jun. 27, 2013

(65) Prior Publication Data
US 2014/0049242 A1 Feb. 20, 2014

(30) Foreign Application Priority Data

Aug. 20, 2012 (JP) .................................. 2012-181669

(51) Int. Cl.
*G05F 1/00* (2006.01)
*H02M 3/158* (2006.01)

(52) U.S. Cl.
CPC .......... *H02M 3/1582* (2013.01); *H02M 3/1584* (2013.01)

(58) Field of Classification Search
CPC ................ H02M 3/156; H02M 3/158; H02M 2001/0045; H02M 3/1588; H02M 3/1584; H02M 3/157; H02M 7/08; H02M 7/493; G05F 1/445; H02J 1/102; H02J 1/10; H02J 9/062

USPC .................. 323/225, 268, 271, 272, 283, 350
See application file for complete search history.

(56) References Cited

U.S. PATENT DOCUMENTS

| | | | |
|---|---|---|---|
| 8,183,848 B2 * | 5/2012 | Kuo | 323/285 |
| 2011/0068818 A1 | 3/2011 | Fukami | |
| 2011/0309811 A1 * | 12/2011 | Kondo et al. | 323/282 |
| 2014/0103937 A1 * | 4/2014 | Khan et al. | 324/509 |

FOREIGN PATENT DOCUMENTS

JP 2011-71174 4/2011

OTHER PUBLICATIONS

Peter Moens et al., "Hot-Carrier Degradation Phenomena in Lateral and Vertical DMOS Transistors", Apr. 2004, pp. 623-628.

* cited by examiner

*Primary Examiner* — Adolf Berhane
*Assistant Examiner* — Alex Torres-Rivera
(74) *Attorney, Agent, or Firm* — Staas & Halsey LLP

(57) ABSTRACT

A regulator device includes: a power input terminal; a power output terminal; a plurality of regulators each including an operating FET and a monitoring FET to be driven together with the operating FET, the plurality of regulators being arranged in parallel between the power input terminal and the power output terminal; and a controller configured to drive the operating FET and the monitoring FET included in one of the regulators, when the controller determines whether the monitoring FET included in the one of the regulators have degraded, the controller configured to stop driving the operating FET and the monitoring FET included in the one of the regulators and configured to drive the operating FET and the monitoring FET included in another of the regulators.

3 Claims, 4 Drawing Sheets

REGULATOR DEVICE HAVING DEGRADATION DETECTION

CROSS-REFERENCE TO RELATED APPLICATION

This application is based upon and claims the benefit of priority of the prior Japanese Patent Application No. 2012-181669, filed on Aug. 20, 2012, the entire contents of which are incorporated herein by reference.

FIELD

The embodiment discussed herein is related to a regulator device.

BACKGROUND

To date, there has been a semiconductor apparatus including a set value storage unit that stores a set value determined based on an initial value of a characteristic of the semiconductor apparatus, and a detector that detects degradation of the characteristic of the semiconductor apparatus based on a value of the characteristic of the semiconductor apparatus at given timing and the set value stored in the set value storage unit.

The conventional semiconductor apparatus diagnoses degradation of a semiconductor device such as a power metal oxide semiconductor field effect transistor (MOSFET) included in the semiconductor apparatus. The semiconductor device is driven when the semiconductor apparatus performs normal operation for supplying power to an external device.

For this reason, while diagnosing degradation of the semiconductor device, the semiconductor apparatus is not able to perform normal operation and has to stop supplying power to an external device. As such, the conventional semiconductor apparatus device has had to stop operation during diagnosis of degradation.

The following is a reference document.
[Document 1] Japanese Laid-open Patent Publication No. 2011-071174.

SUMMARY

According to an aspect of the invention, A regulator device includes: a power input terminal; a power output terminal; a plurality of regulators each including an operating FET and a monitoring FET to be driven together with the operating FET, the plurality of regulators being arranged in parallel between the power input terminal and the power output terminal; and a controller configured to drive the operating FET and the monitoring FET included in one of the regulators, when the controller determines whether the monitoring FET included in the one of the regulators have degraded, the controller configured to stop driving the operating FET and the monitoring FET included in the one of the regulators and configured to drive the operating FET and the monitoring FET included in another of the regulators.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENT

Hereinafter, an embodiment to which a regulator device of the present disclosure is applied will be described.

Embodiment

Figure 1:
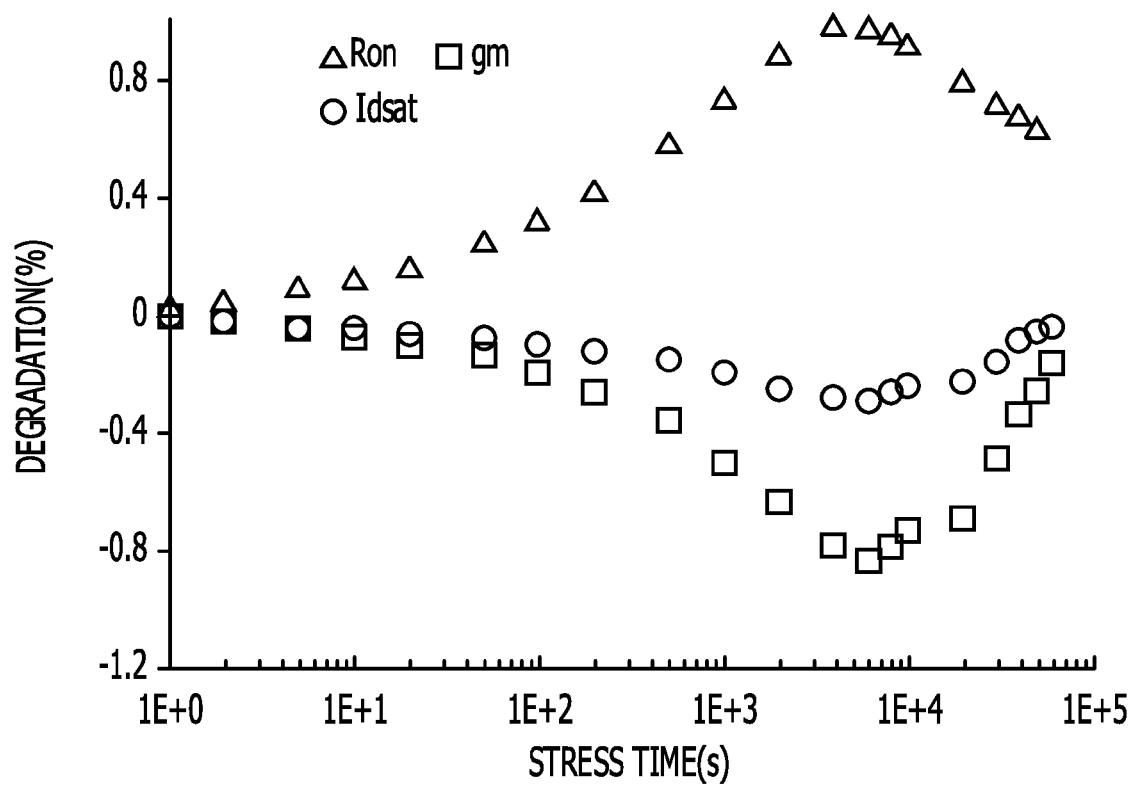
FIG. 1 is a graph illustrating time-dependent changes of the on-resistance in a DMOS transistor.

FIG. 1 is a graph illustrating time-dependent changes of the on-resistance in a dual diffused metal oxide semiconductor (DMOS) transistor.

A regulator device of the embodiment converts power by switching and driving devices, such as DMOS transistors, whose on-resistances increase under the influence of hot carriers. For this reason, before describing the regulator device of the embodiment, a description of the time-dependent changes of the on-resistance in a DMOS transistor will now be given.

In FIG. 1, the horizontal axis represents the time (stress time (s)) during which hot-carrier stress is applied to a DMOS transistor, and the vertical axis represents the level of degradation (%). The time during which hot-carrier stress is applied is the time during which the DMOS transistor is switched and driven. The levels of degradation (%) on the vertical axis represent the amounts of change in the on-resistance (Ron), conductance (gm), and drain current (Id) of the DMOS transistor from their initial values. These amounts are expressed as percentages.

In FIG. 1, triangles (Δ) are plotted for the on-resistance (Ron) of the DMOS transistor, squares (□) are plotted for the conductance (gm) of the DMOS transistor, and circles (○) are plotted for the drain current (Id).

As illustrated in FIG. 1, as the time during which hot-carrier stress is applied to a DMOS transistor elapses, the on-resistance of the DMOS transistor increases, and the conductance and the drain current decrease.

In this fashion, it is found that the longer the time during which hot-carrier stress is applied to a DMOS transistor (that is, the longer the time during which the transistor is used), the more the on-resistance of the DMOS transistor degrades.

Note that, the on-resistance reaches a peak at just over 1E+4 (s) along the horizontal axis and then decreases, and the conductance and the drain current hit bottom at just over 1E+4 and then increases. However, a DMOS transistor usually exceeds the tolerance limit of degradation before the on-resistance reaches a peak and the conductance and the drain current hit bottom.

That is, the area where the on-resistance decreases after reaching a peak and the conductance and the drain current increase after hitting bottom is in a state where the degradation has increased to such a level that the DMOS transistor is usually not used.

Such time-dependent changes of the on-resistance in a DMOS transistor are described in "Hot-Carrier Degradation Phenomena in Lateral and Vertical DMOS Transistors", IEEE TRANSACTIONS ELECTRON DEVICES, VOL. 51, NO. 4, April, 2004, for example.

Figure 2:
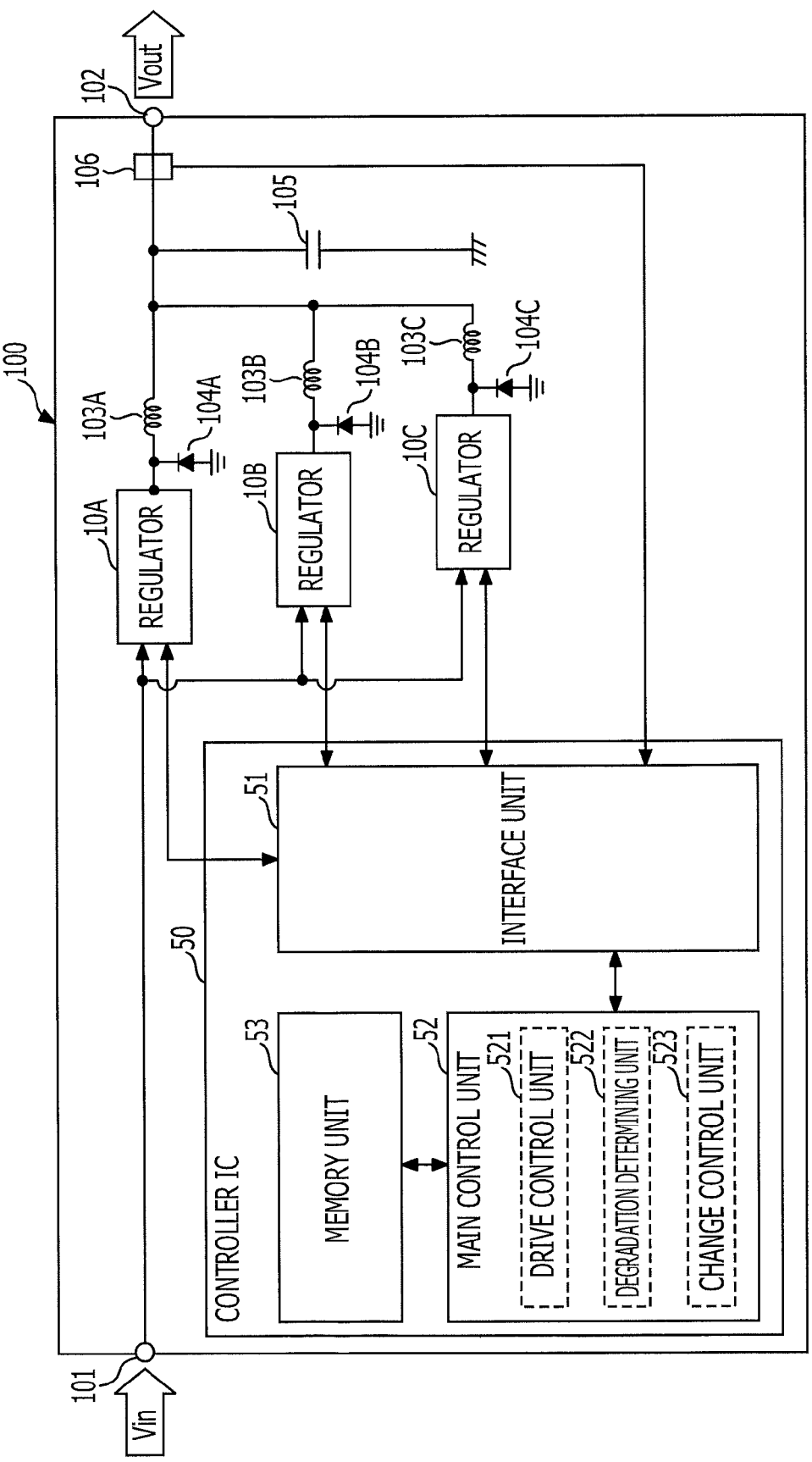
FIG. 2 is a block diagram illustrating a regulator device of an embodiment.

A regulator device of the embodiment will be described next. FIG. 2 is a block diagram illustrating a regulator device 100 of the embodiment.

The regulator device 100 of the embodiment includes three regulators 10A, 10B, and 10C, a controller integrated circuit (IC) 50, a power input terminal 101, a power output terminal 102, reactors 103A, 103B, and 103C, diodes 104A, 104B, and 104C, a capacitor 105, and an output current detecting unit 106.

The regulator device 100 is a device that is built into an information processing device, such as a server or the base station of a mobile phone, and supplies power from the power output terminal to the information processing device, for example.

The regulators 10A, 10B, and 10C (hereinafter denoted as 10A to 10C) are connected in parallel between the power input terminal 101 and the power output terminal 102. The regulators 10A to 10C have the same internal configuration. The regulators 10A to 10C each include operating field effect transistors (FETs) and a monitoring FET.

The operating FET is a switching device used to perform switching at the time of conversion of power. The monitoring FET is an FET having the same type and size as the operating FET, and is switched together with the operating FET. The monitoring FET, however, is not used for conversion of power but is used for monitoring of the level of degradation. The sizes of the operating FET and the monitoring FET are equal. In other words, for example, the gate widths and gate lengths of the operating FET and the monitoring FET are equal.

Figure 3:
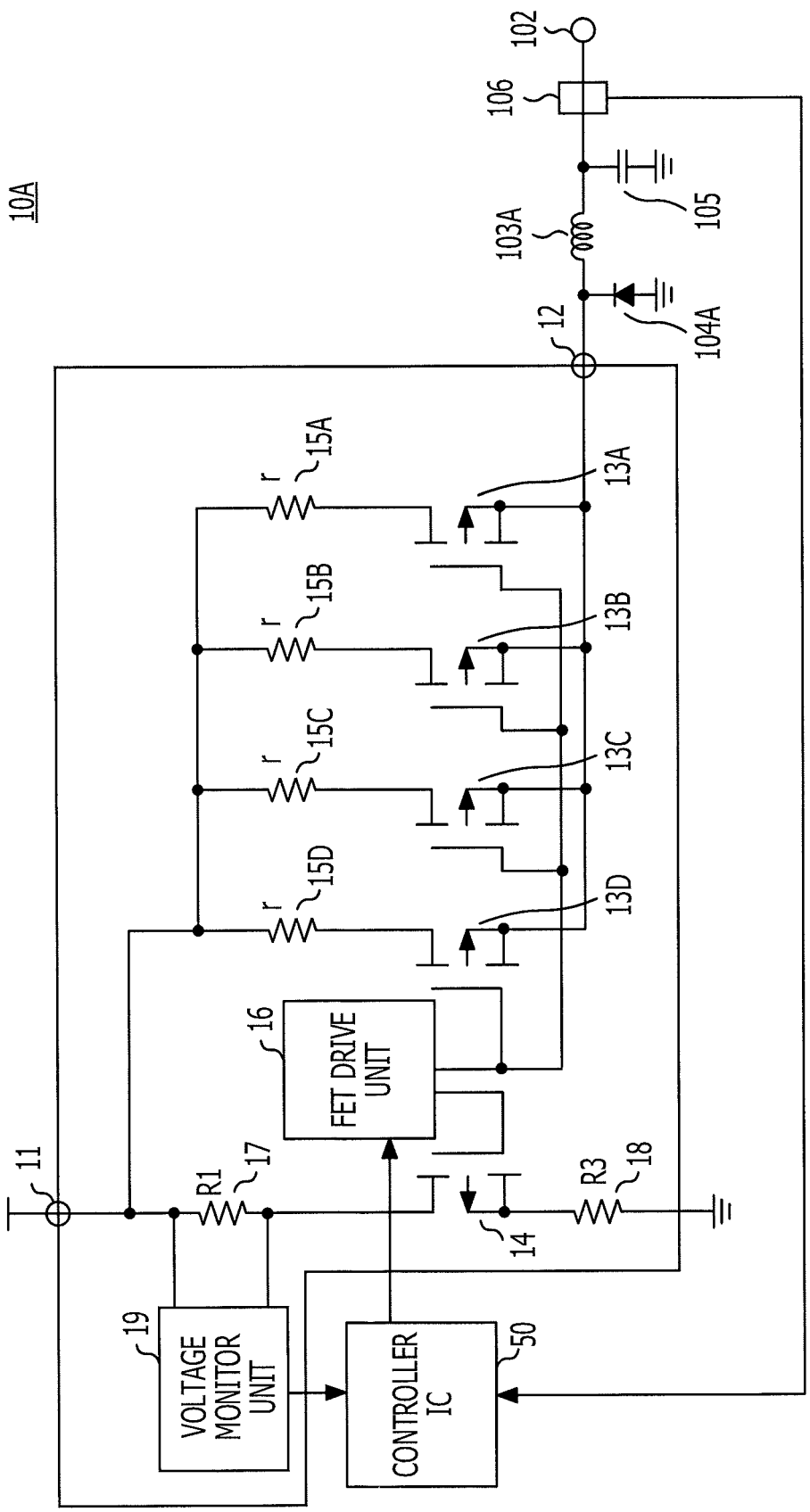
FIG. 3 is a circuit diagram illustrating an internal configuration of a regulator for use in the regulator device of the embodiment.

Note that the detailed internal configurations of the regulators 10A to 10C will be described below with reference to FIG. 3. Also, each of the regulators 10A to 10C will be referred to as a regulator 10 if the regulators 10A to 10C are not to be discriminated from one another.

Also, here, by way of example, it is assumed that before a process for changing the regulators 10A to 10C is performed, the regulators 10A and 10B are selected by the controller IC 50, and convert power input from the power input terminal 101 (step down the voltage) and output the power to the power output terminal 102.

As such, the regulator device 100 of the embodiment does not use at least one (the regulator 10C in this example) of a plurality of regulators for power conversion operation, and puts the at least one regulator on standby. The regulator 10C is put on standby in this way in order for a change from the regulator 10A or 10B to the regulator 10C to be made when degradation has occurred in the regulator 10A or 10B.

Since at least one regulator is put on standby in such a manner, the output capacity of the regulator device 100 is set such that the regulator device 100 in a state where the at least one regulator put on standby is excluded from the regulator device 100 is able to supply power to the information processing device.

For example, in the case where an information processing device into which the regulator device 100 is built uses a power of 40 W, the output capacitances of the regulators 10A to 10C may each be set to 20 W if power is supplied from two of the regulators 10A to 10C to the information processing device.

The controller IC 50 includes an interface unit 51, a main control unit 52, and a memory unit 53. The interface unit 51 is a unit for inputting and outputting data between the regulators 10A to 10C and the controller IC 50.

The main control unit 52 includes a drive control unit 521, a degradation determining unit 522, and a change control unit 523. The main control unit 52 may be implemented by a central processing unit (CPU), for example.

The drive control unit 521 controls driving of the operating FETs and monitoring FETs included in the regulators 10A to 10C. On the basis of a current value detected by the output current detecting unit 106, the drive control unit 521 determines the duty cycle of a driving signal for driving the operating FETs of the regulators 10A to 10C. The drive control unit 521 determines the duty cycle so as to step down the voltage of power input from the power input terminal 101 and to cause the voltage output from the power output terminal 102 to have a fixed value.

Here, by way of example, it is assumed that before the process for changing the regulator 10 is performed, the drive control unit 521 controls driving of the regulators 10A and 10B, and does not control driving of the regulator 10C.

The degradation determining unit 522 determines whether the monitoring FETs included in the regulators 10A to 10C have degraded. The degradation determining unit 522 measures the on-resistances of the monitoring FETs included in the regulators 10A to 10C, and compares the measured on-resistances with the threshold stored in the memory unit 53, thereby determining whether the monitoring FETs included in the regulators 10A to 10C have degraded.

Here, by way of example, it is assumed that before the process for changing the regulator 10 is performed, the degradation determining unit 522 makes a determination regarding the presence or absence of degradation of the monitoring FETs included in the regulators 10A and 10B.

Note that, here, by way of example, although the regulator 10C is a regulator in which the degradation of the monitoring FET has not occurred, the degradation determining unit 522 may make a determination regarding the presence or absence of degradation of the monitoring FET in the regulator 10C in order to check to see that the degradation of the monitoring FET in the regulator 10C has not occurred.

The change control unit 523 is a change control unit that makes a change from a regulator whose monitoring FET has degraded (any of the regulators 10A to 10C) to another regulator whose monitoring FET has not degraded (any of the regulators 10A to 10C).

Here, by way of example, before the process for changing the regulator 10 is performed, the drive control unit 521 controls driving of the regulators 10A and 10B. If it is determined by the degradation determining unit 522 that the monitoring FET of the regulator 10A has degraded, however, the change control unit 523 makes a change from the regulator 10A to the regulator 10C. After the change from the regulator 10A to the regulator 10C, the regulator device 100 supplies power to the information processing device by using the regulators 10B and 10C.

A change instruction generated by the change control unit 523 for controlling a change in the regulators 10A to 10C is transmitted to the drive control unit 521. The drive control unit 521 supplies driving signals to the regulators (any two of the regulators 10A to 10C) selected after the change based on the change instruction.

The memory unit 53 is a memory that stores threshold data indicating a threshold for the on-resistances of the monitoring FETs of the regulators 10A to 10C. The on-resistance threshold indicated by the threshold data is +10% of the on-resistance (initial value) of a monitoring FET that has yet to be used, for example. The on-resistance threshold indicated by the threshold data may be set to such an appropriate value as to bring no obstacle to the operation of the regulator device 100, in accordance with the operational characteristics and so on of the monitoring FET.

A nonvolatile memory, for example, is used as the memory unit 53. This is because a nonvolatile memory enables the threshold data to be maintained even if the regulator device 100 is powered off. Data indicating the on-resistance calculated by the degradation determining unit 522 is also stored in the memory unit 53. The memory unit 53 is an example of a storage unit.

The power input terminal 101 is a terminal to which power (Vin) to be supplied to a server into which the regulator device 100 is built is input. For example, a direct-current voltage from 5 V to 12 V is input to the power input terminal 101. The direct-current voltage input to the power input terminal 101 is converted to a direct-current voltage having a predetermined value in the regulator device 100, and is output from the power output terminal 102. Here, by way of example, it is assumed that a direct-current voltage from 1.8 V to 5 V is output from the power output terminal 102. Power (Vout) output from the power output terminal 102 is supplied to an IC and so forth in the information processing device, such as a server, into which the regulator device 100 is built.

One ends of the reactors 103A, 103B, and 103C are connected to the output sides of the regulators 10A to 10C, respectively. The other ends of the reactors 103A, 103B, and 103C are connected to the power output terminal 102.

The reactors 103A, 103B, and 103C are provided in order to generate an induced electromotive force for power conversion in accordance with the on-off states of the operating FETs in the regulators 10A to 10C. Induction coils may be used as the reactors 103A, 103B, and 103C.

The cathodes of the diodes 104A, 104B, and 104C are connected between the regulators 10A, 10B, and 10C and the reactors 103A, 103B, and 103C, respectively, and the anodes of the diodes 104A, 104B, and 104C are grounded.

One end of the capacitor 105 is connected between the reactors 103A, 103B, and 103C and the power output terminal 102, and the other end of the capacitor 105 is grounded. The capacitor 105 is a smoothing capacitor, and is inserted for the purpose of smoothing a voltage output from the power output terminal 102.

The output current detecting unit 106 is a current sensor that detects the value of a current output from the power output terminal 102. The current value detected by the output current detecting unit 106 is fed back to the drive control unit 521 of the controller IC 50 in order to determine the duty cycles of driving signals for driving the operating FETs of the regulators 10A to 10C.

Note that FIG. 2 illustrates a circuit configuration in which the reactors 103A, 103B, and 103C and the diodes 104A, 104B, and 104C are connected between the regulators 10A to 10C and the power output terminal 102. However, the number of regulators and the number of diodes may each be one. The regulators 10A to 10C may be connected in parallel to one regulator and one diode.

The regulator 10 will be described next. FIG. 3 is a circuit diagram illustrating an internal configuration of the regulator 10A for use in the regulator device 100 of the embodiment. The step-down regulator 10A is illustrated by way of example in FIG. 3. The regulators 10B and 10C have the same internal configuration as the regulator 10A illustrated in FIG. 3, and therefore description will be given of just the regulator 10A here.

The regulator 10A includes a power input terminal 11, a power output terminal 12, operating FETs 13A, 13B, 13C, and 13D, a monitoring FET 14, and resistors 15A, 15B, 15C, and 15D.

The regulator 10A further includes an FET drive unit 16, resistors 17 and 18, and a voltage monitor unit 19.

The power input terminal 11 is connected to the power input terminal 101 (refer to FIG. 2) of the regulator device 100 and power to be supplied to a server into which the regulator device 100 is built is input to the power input terminal 11. For example, a direct-current voltage from 5 V to 12 V is input.

The power output terminal 12 is connected to the power output terminal 102 of the regulator device 100, and outputs power that has been converted in the regulator 10. The power output from the power output terminal 12 is output from the power output terminal 102 of the regulator device 100.

The gates of the operating FETs 13A, 13B, 13C, and 13D are connected to the FET drive unit 16, the sources of the operating FETs 13A, 13B, 13C, and 13D are connected to the resistors 15A, 15B, 15C, and 15D, respectively, and the drains of the operating FETs 13A, 13B, 13C, and 13D are connected to the power output terminal 12.

The operating FETs 13A, 13B, 13C, and 13D are switching devices that are driven by the FET drive unit 16, and P-type metal oxide semiconductor field effect transistors (PMOS-FETs) formed of DMOS transistors, for example, may be used as the operating FETs 13A, 13B, 13C, and 13D. The operating FETs 13A, 13B, 13C, and 13D perform switching in order to step down the voltage of power input from the power input terminal 11.

The gate of the monitoring FET 14 is connected to the FET drive unit 16, the source of the monitoring FET 14 is connected to the resistor 17, and the drain of the monitoring FET 14 is connected to the resistor 18.

The monitoring FET 14 is a switching device whose on-off states are controlled by the FET drive unit 16, and a PMOS-FET formed of a DMOS transistor, for example, may be used as the monitoring FET 14. The monitoring FET 14 is an FET having the same type and size as the operating FETs 13A to 13D, and is switched together with the operating FETs 13A to 13D by the FET drive unit 16. The monitoring FET, however, is not used for conversion of power but is used for monitoring of the level of degradation.

One ends (terminals illustrated on the upper side in FIG. 3) of the resistors 15A to 15D are each connected to the power input terminal 11, and the other ends (terminals illustrated on the lower side in FIG. 3) of the resistors 15A to 15D are connected to the sources of the operating FETs 13A to 13D, respectively. Here, all of the resistances of the resistors 15A to 15D are the same, and the resistance is r.

The FET drive unit 16 is a driver that controls the on-off states of the operating FETs 13A to 13D and the monitoring FET 14. As the FET drive unit 16, an amplifier that amplifies driving signals for the operating FETs 13A to 13D and the monitoring FET 14 input from the controller IC 50, for example, may be used.

One end (a terminal illustrated on the upper side in FIG. 3) of the resistor 17 is connected to the power input terminal 11, and the other end (a terminal illustrated on the lower side in FIG. 3) of the resistor 17 is connected to the source of the monitoring FET 14. The resistance of the resistor 17 is R1.

One end (a terminal illustrated on the upper side in FIG. 3) of the resistor 18 is connected to the drain of the monitoring FET 14, and the other end (a terminal illustrated on the lower side in FIG. 3) of the resistor 18 is grounded. The resistance of the resistor 18 is R3.

The voltage monitor unit 19 is a voltage sensor that detects a voltage across the resistor 17. The signal indicating the voltage detected by the voltage monitor unit 19 is input to the controller IC 50.

Here, a method for driving the operating FETs 13A to 13D and the monitoring FET 14 by using the controller IC 50, and a method for making a determination regarding the presence or absence of degradation of the monitoring FET 14 will be described.

During normal operation when the operating FETs 13A to 13D are switched and driven for the purpose of power conversion and the degradation of the monitoring FET 14 is not diagnosed, the main control unit 52 of the controller IC 50 drives the monitoring FET 14 in a same timing as for the operating FETS 13A to 13D. Driving signals are generated by the drive control unit 521 of the main control unit 52. Note that this driving mode during normal operation is referred to as a normal mode.

Although the monitoring FET 14 is not relevant to power conversion, the monitoring FET 14 is driven using the same driving signal as for the operating FETs 13A to 13D in order to cause the same level of degradation of the monitoring FET 14 as for the operating FETs 13A to 13D.

When the degradation of the monitoring FET 14 is diagnosed, the main control unit 52 of the controller IC 50 drives the operating FETs 13A to 13D using driving signals in the same way as during normal operation, and inputs a driving signal at the L level to the gate of the monitoring FET 14, thereby maintaining the monitoring FET 14 in the on state. This driving mode is referred to as a measurement mode.

Note that the driving signals for driving the operating FETs 13A to 13D in the same way as during normal operation and the driving signal for maintaining the monitoring FET in the on state are generated by the drive control unit 521 of the main control unit 52.

In order to diagnose the degradation of the monitoring FET 14, the degradation determining unit 522 calculates the voltage across the resistor 17 from an output signal of the voltage monitor unit 19 while the monitoring FET 14 is maintained in the on state. Then, the degradation determining unit 522 calculates the on-resistance of the monitoring FET 14 on the basis of the voltage across the resistor 17.

Here, provided that the on-resistance of the monitoring FET 14 is R2, the voltage monitor unit 19 detects a voltage divided by using three resistors, the resistor 17 (the resistance R1), the monitoring FET 14 (the on-resistance R2) and the resistor 18 (the resistance R3). If the on-resistance R2 of the monitoring FET 14 rises, the current flowing through the resistor 17, the monitoring FET 14, and the resistor 18 decreases, and the voltage detected by the voltage monitor unit 19 decreases.

The degradation determining unit 522 calculates the on-resistance of the monitoring FET 14 by comparing the voltage detected by the voltage monitor unit 19 with the voltage detected by the voltage monitor unit 19 when degradation of the monitoring FET 14 has not occurred. Note that data indicating the voltage detected by the voltage monitor unit 19 when degradation of the monitoring FET 14 has not occurred may be stored in the memory unit 53, for example.

Additionally, the degradation determining unit 522 compares the calculated on-resistance of the monitoring FET 14 with the threshold for the on-resistance of the monitoring FET 14 indicated by the threshold data stored in the memory unit 53 (refer to FIG. 2), thereby determining whether the calculated on-resistance is equal to or larger than the threshold for the resistance. The degradation determining unit 522 transmits a determination result to the change control unit 523.

If the determination result of the degradation determining unit 522 indicates that the calculated on-resistance is equal to or larger than the threshold for the on-resistance, the change control unit 523 makes a change from a regulator (any of the regulators 10A to 10C) including the monitoring FET 14 having a resistance equal to or larger than the threshold to another regulator.

For example, in the case where power conversion is performed by the regulators 10A and 10B before a degradation determination is made, if it is determined by the degradation determining unit 522 that the monitoring FET 14 in the regulator 10A has degraded, the change control unit 523 makes a change from the regulator 10A to the regulator 10C. When a change from the regulator 10A to the regulator 10C has been made, the regulator device 100 supplies power to the information processing device by using the regulators 10B and 10C.

Figure 4:
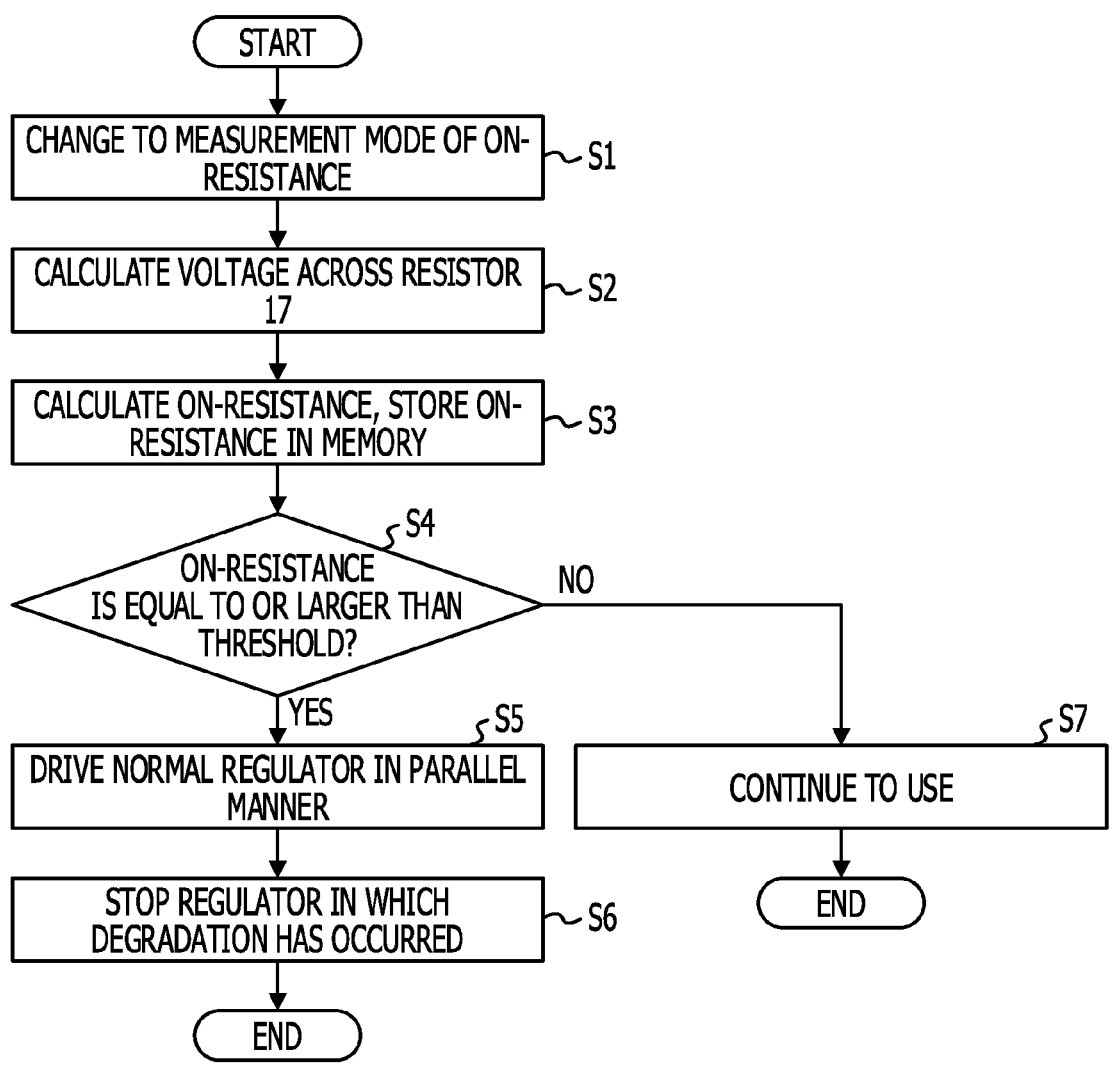
FIG. 4 is a flowchart illustrating a process for changing regulators by using the regulator device of the embodiment.

With reference to FIG. 4, the process for changing the regulators 10A to 10C by using the regulator device 100 of the embodiment will be described.

FIG. 4 is a flowchart illustrating a process for changing the regulators 10A to 10C by using the regulator device 100 of the embodiment. The process illustrated in FIG. 4 is carried out by the main control unit 52 of the controller IC 50.

The main control unit 52 starts the process (Start) upon receipt of a command from the information processing device, such as a server, including the regulator device 100, or a higher-level monitoring device, such as an external server, connected through a network or the like to that information processing device.

The main control unit 52 inputs a change instruction for changing a driving signal to the measurement mode to the drive control unit 521 in order to measure the on-resistances of the monitoring FETs 14 of the regulators 10A to 10C (step S1). In response to this, the drive control unit 521 drives the operating FETs 13A to 13D and the monitoring FET 14 in the measurement mode.

In the measurement mode, the drive control unit 521 of the main control unit 52 drives the operating FETs 13A to 13D using driving signals in the same way as in the normal mode, and maintains the monitoring FET 14 in the on state by inputting an L-level driving signal to the gate of the monitoring FET 14.

Subsequently, the main control unit 52 calculates a voltage across the resistor 17 (step S2). The operation of step S2 is performed such that the degradation determining unit 522 of the main control unit 52 calculates the voltage across the resistor 17 from an output signal of the voltage monitor unit 19 in order to diagnose degradation of the monitoring FET 14.

Subsequently, the main control unit 52 calculates the on-resistance of the monitoring FET 14 and stores data indicating the on-resistance in the memory unit 53 (step S3). The operation of step S3 is performed in such a way that the degradation determining unit 522 calculates the on-resistance of the monitoring FET 14 based on the voltage across the resistor 17.

Subsequently, the main control unit 52 determines whether the on-resistance is equal to or larger than a threshold (step S4). The operation of step S4 is performed in such a way that the degradation determining unit 522 compares the calculated on-resistance of the monitoring FET 14 with the threshold for the on-resistance of the monitoring FET 14 indicated by the threshold data stored in the memory unit 53 (refer to FIG. 2), and determines whether the calculated on-resistance is equal to or larger than the threshold for the on-resistance. The degradation determining unit 522 transmits a determination result to the change control unit 523.

Note that the operations of steps S3 and S4 are operations performed for all the regulators (any of the regulators 10A to 10C) that perform power conversion.

For example, in the case where the regulators 10A and 10B perform power conversion, the on-resistance of the monitoring FET included in each of the regulators 10A and 10B is calculated (step S3), and the calculated on-resistance is compared with the threshold (step S4).

If it is determined that the on-resistance is equal to or larger than the threshold (step S4: YES), the main control unit 52 starts driving a normal regulator in which degradation has not occurred (any of the regulators 10A to 10C) in a parallel manner (step S5). This is in order to drive in advance a regulator to be driven instead of the regulator in which degradation has occurred. The operation of step S5 is an operation performed by the change control unit 523 of the main control unit 52.

For example, in the case where the regulators 10A and 10B perform power conversion, if the on-resistance of the monitoring FET 14 of the regulator 10A becomes equal to or larger than the threshold, the driving of the regulator 10C is started before the driving of the regulator 10A is stopped in order to make a change from the regulator 10A in which degradation has occurred to the normal regulator 10C in which degradation has not occurred. This is in order to secure power supply during a change between regulators.

The driving of the regulator 10C is performed in such a way that, upon receipt of a change instruction from the change control unit 523, the drive control unit 521 drives the regulator 10C in the normal mode.

Subsequently, the main control unit 52 stops the regulator in which degradation has occurred (step S6).

For example, in the case where the regulators 10A and 10B perform power conversion, if the on-resistance of the monitoring FET 14 of the regulator 10A becomes equal to or larger than the threshold and the driving of the regulator 10C is started by the operation of step S5, the driving of the regulator 10A in which degradation has occurred is stopped.

After the completion of the operation of step S6, the main control unit 52 ends the series of operations (End).

Note that if the main control unit 52 determines in step S4 that the on-resistance is not equal to or larger than the threshold, the flow proceeds to step S7.

If the flow proceeds to step S7, degradation has not occurred in regulators (any of the regulators 10A to 10C) that currently perform power conversion, and therefore the main control unit 52 continues to use the regulators that currently perform power conversion (step S7).

In step S7, the main control unit 52 causes the drive control unit 521 to continue driving in the normal mode.

For example, in the case where the regulators 10A and 10B perform power conversion, the power conversion performed by the regulators A and B will be continued.

After the completion of the operation of step S7, the main control unit 52 ends the series of operations (End).

As described above, with the regulator device 100 of the embodiment, the degradation of the monitoring FET 14 may be diagnosed, while the operating FETs 13A to 13D perform power conversion, by monitoring the on-resistance of the monitoring FET 14.

If it is found that degradation has occurred in any of the regulators (any of the regulators 10A to 10C), a change to a regulator (any of the regulators 10A to 10C) in which degradation has not occurred may be made. This enables degradation monitoring and changing of the regulator (any of the regulators 10A to 10C) to be realized under conditions where the operation of the information processing device or the like including the regulator device 100 is continued.

Therefore, the regulator device 100 capable of changing a regulator (any of the regulators 10A to 10C) in which degradation has occurred without stopping the operation may be provided.

Note that description has been given of the form in which the operating FETs 13A, 13B, 13C, and 13D and the monitoring FETs 14 are implemented by PMOSFETs formed of DMOS transistors.

The operating FETs 13A, 13B, 13C, and 13D and the monitoring FETs 14, however, are not limited to DMOS transistors, and may be transistors other than DMOS transistors as long as they are transistors whose on-resistances increase because of time-dependent changes.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A regulator device comprising:
   a power input terminal;
   a power output terminal;
   a plurality of regulators each including an operating FET and a monitoring FET to be driven together with the operating FET, the plurality of regulators being arranged in parallel between the power input terminal and the power output terminal; and
   a controller configured to drive the operating FET and the monitoring FET included in one of the plurality of regulators,
   the controller being configured to stop driving the operating FET and the monitoring FET included in the one of the plurality of regulators, and being configured to drive the operating FET and the monitoring FET included in another one of the plurality of regulators, in response to the controller determining that the monitoring FET included in the one of the plurality of regulators has degraded by measuring an on-resistance of the monitoring FET included in the one of the plurality of regulators.

2. The regulator device according to claim 1, wherein the controller switches the operating FET and the monitoring FET included in the one of the plurality of regulators in a same timing during normal operation when the controller is not diagnosing degradation of the monitoring FET included in the one of the plurality of regulators, and
   the controller switches the operating FET and maintains the monitoring FET included in the one of the plurality of regulators in an on state during a measurement mode when the controller diagnoses degradation of the monitoring FET included in the one of the plurality of regulators.

3. The regulator device according to claim 1, further comprising a memory storing threshold data indicating an on-resistance threshold for diagnosis of the degradation of the monitoring FET included in the one of the plurality of regulators,
   wherein the controller determines whether the monitoring FET included in the one of the plurality of regulators has degraded, by comparing the threshold indicated by the threshold data stored in the memory with the on-resistance of the monitoring FET included in the one of the plurality of regulators.

* * * * *